(12) United States Patent
Davies et al.

(10) Patent No.: US 7,668,411 B2
(45) Date of Patent: Feb. 23, 2010

(54) DISTRIBUTED VIBRATION SENSING SYSTEM USING MULTIMODE FIBER

(75) Inventors: Dylan Davies, Stroud (GB); Arthur H. Hartog, Winchester (GB); Kamal Kader, Southampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/134,339

(22) Filed: Jun. 6, 2008

(65) Prior Publication Data

US 2009/0304322 A1    Dec. 10, 2009

(51) Int. Cl.
G02B 6/00    (2006.01)
(52) U.S. Cl. ......................................................... 385/12
(58) Field of Classification Search ................... 385/12, 385/13
See application file for complete search history.

(56) References Cited

U.S. PATENT DOCUMENTS

| | | | |
|---|---|---|---|
| 5,082,368 A | 1/1992 | Fuchs et al. | |
| 5,194,847 A | 3/1993 | Taylor et al. | |
| 5,848,204 A * | 12/1998 | Wanser ......................... | 385/12 |
| 6,557,630 B2 | 5/2003 | Harkins et al. | |
| 6,590,647 B2 | 7/2003 | Stephenson | |
| 6,751,556 B2 | 6/2004 | Schroeder et al. | |
| 6,997,256 B2 | 2/2006 | Williams et al. | |
| 7,240,730 B2 | 7/2007 | Williams et al. | |
| 7,254,289 B2 | 8/2007 | Wait et al. | |
| 7,304,725 B2 | 12/2007 | Hartog et al. | |
| 7,333,681 B2 * | 2/2008 | Murphy et al. ................. | 385/12 |
| 2004/0129418 A1 | 7/2004 | Jee et al. | |
| 2005/0087344 A1 | 4/2005 | Toekje et al. | |
| 2005/0140966 A1 | 6/2005 | Yamate et al. | |
| 2005/0149264 A1 | 7/2005 | Tarvin et al. | |
| 2006/0115204 A1 | 6/2006 | Marsh et al. | |
| 2007/0199696 A1 | 8/2007 | Walford | |
| 2009/0097015 A1 * | 4/2009 | Davies et al. .............. | 356/73.1 |

FOREIGN PATENT DOCUMENTS

| | | |
|---|---|---|
| GB | 2403292 A | 12/2004 |
| GB | 2424311 A | 9/2006 |
| WO | 03065619 A2 | 8/2003 |
| WO | 03065619 A3 | 8/2003 |
| WO | 03102370 A1 | 12/2003 |

(Continued)

OTHER PUBLICATIONS

Healey, P., Statistics of Rayleigh backscatter from a single-mode optical fibre. Electronics Letters, 1985. 21(6): p. 226.

(Continued)

*Primary Examiner*—Charlie Peng
(74) *Attorney, Agent, or Firm*—James L. Kurka; Daryl R. Wright; Trop, Pruner & Hu P.C

(57) ABSTRACT

An optical time domain reflectometry (OTDR) system is configured to detect Rayleigh backscatter reflected from a multimode sensing optical fiber. The system includes a single spatial mode filtering system to select a single speckle of the Rayleigh backscatter produced in response to an optical pulse launched into the multimode fiber. The detected single speckle may be used for distributed disturbance (vibration) detection.

20 Claims, 4 Drawing Sheets

FOREIGN PATENT DOCUMENTS

| WO | 2004057780 A1 | 7/2004 |
| WO | 2004104536 A1 | 12/2004 |
| WO | 2006048647 A2 | 5/2006 |
| WO | 2006097671 A1 | 9/2006 |
| WO | 2007131662 A1 | 11/2007 |
| WO | 2007141464 A1 | 12/2007 |
| WO | 2008023143 A1 | 2/2008 |
| WO | 2008040939 A1 | 4/2008 |

OTHER PUBLICATIONS

Juarez, J.C., et al., Distributed fiber-optic intrusion sensor system. Journal of Lightwave Technology, 2005. 23(6): p. 2081-2087.

Juarez, J.C. and H.F. Taylor, Polarization discrimination in a phase-sensitive optical time-domain reflectometer intrusion-sensor system. Optics Letters, 2005. 30(24): p. 3284-6.

Juarez, J.C. and H.F. Taylor, Field test of a distributed fiber-optic intrusion sensor system for long perimeters. Applied Optics, 2007. 46(11): p. 1968-71.

Juskaitis, R., et al., Interferometry with Rayleigh backscattering in a single-mode optical fiber. Optics Letters, 1994. 19(3): p. 225.

Juskaitis, R., et al., Distributed interferometric fiber sensor system. Optics Letters, 1992. 17(22): p. 1623-5.

Posey, R.J., G.A. Johnson, and S.T. Vohra; Rayleigh Scattering Based Distributed Sensing System for Structural Monitoring. in 14th Conference on Optical Fibre Sensors. 2001. Venice, Italy.

Posey, R.J., G.A. Johnson, and S.T. Vohra, Strain sensing based on coherent Rayleigh scattering in an optical fibre. Electronics Letters, 2000. 36(20): p. 1688-89.

Mermelstein, M.D., et al., Rayleigh scattering optical frequency correlation in a single-mode optical fiber. Optics Letters, 2001. 26(2): p. 58-60.

* cited by examiner

DISTRIBUTED VIBRATION SENSING SYSTEM USING MULTIMODE FIBER

BACKGROUND

Coherent Rayleigh noise (CRN) acquisition is a technique usable in an optical time domain reflectometry (OTDR) system which allows very small changes in the length and/or temperature of an optical fiber to be detected. As changes in the length of the optical fiber may be related to strain and/or a disturbance imparted on the fiber, a CRN acquisition system can be particularly useful to measure parameters indicative of a problem or potential problem with an elongate structure in proximity to the optical fiber, such as an energy cable, a pipeline, etc. As one example, CRN can be used to detect an encroachment, on an energy cable, for example caused by inadvertent or deliberate digging in the vicinity of the cable. In addition, it could be used to detect partial discharge (PD) through either the vibration induced by PD or the heat generated. Because partial discharge occurs in energy cables prior to complete installation failure, the vibration caused by the partial discharge can be detected via a CRN technique, thus enabling remedial action to be taken prior to damage or failure occurring. CRN also has applications in intrusion detection, as well as in the detection of acoustic events, such as flow-induced noise. Yet further, when used in conjunction with a distributed temperature sensor (DTS) system, data obtained from DTS installations may be refined based on a distributed measurement of vibration or disturbance obtained from the CRN measurement.

To our knowledge, no commercial installations exist where DTS and CRN are used simultaneously. The most common approach to DTS has been Raman OTDR, with some suppliers also offering Raman optical frequency-domain reflectometry (OFDR). Traditionally, DTS measurements over moderate distances (e.g., up to 10 km) have been carried out on multimode fiber, owing to the higher backscatter factor in these fibers, i.e. the higher ratio of usable Raman signal returned to the energy launched into the fiber. There are many thousands of DTS installations worldwide using multimode fiber.

In contrast, it has hitherto been thought that CRN measurements required a single mode fiber to provide a high contrast as a result of a single spatial mode. However, the use of single-mode fiber for DTS measurements degrades the performance (relative to that obtainable on multimode fiber) in Raman systems, at least over moderate distances. Thus an installation requiring DTS and CRN in the same region of interest would generally require two separate fibers: a multimode fiber for DTS measurements and a single-mode fiber for CRN measurements. The installation of separate fibers, however, is not particularly desirable, particularly in terms of cost, as well as in terms of the engineering required to install additional fibers. Alternatively, because the use of multimode fibers for CRN measurements has been avoided since multimode fibers do not produce Rayleigh backscatter that has sufficient contrast for phase changes to be detected by a data acquisition system, a single single-mode fiber could be employed for both DTS and CRN measurements. However, such an arrangement will result in a compromise in the DTS performance. Because of these limitations, pre-existing DTS installations using multimode fiber have been unavailable to use for CRN measurements because of the nature of the fiber in place.

SUMMARY

In an embodiment of the invention, an OTDR system for sensing a disturbance to an elongate structure comprises a multimode sensing optical fiber disposed proximate the elongate structure, and an optical source configured to output a pulse of light for launching into the multimode sensing optical fiber. The system further includes a data acquisition system to detect Rayleigh backscattered light produced by the multimode sensing optical fiber in response to the pulse of light. The data acquisition system is configured to detect a single spatial mode of the Rayleigh backscattered light and to produce a signal indicative of a disturbance to the elongate structure based on the detected single spatial mode of the Rayleigh backscattered light.

In accordance with another embodiment of the invention, a method for sensing a disturbance to an elongate structure comprises providing a multimode sensing optical fiber disposed proximate the elongate structure, and launching a pulse of light into the multimode fiber. The method further comprises detecting a single spatial mode of Rayleigh backscattered light produced by the multimode fiber in response to the pulse of light, and producing a signal indicative of a disturbance of the elongate structure based on the detected single spatial mode.

Other or alternative features will become apparent from the following description, from the drawings, and from the claims.

DETAILED DESCRIPTION

Detection or monitoring of parameters over the length of an elongate structure can be achieved by deploying one or more optical fibers along the structure and using optical time domain reflectometry (OTDR). OTDR involves launching an appropriate optical signal into a sensing optical fiber and then detecting returned signals which could be indicative of a problem or a potential problem with the elongate structure. For instance, the acquisition of coherent Rayleigh noise can be used to monitor generally fast-changing parameters, such as strain or vibration transients that may result from third-party interference events, natural phenomena, partial discharge events, etc.

In typical CRN detection systems, a highly coherent and frequency-stable optical source launches a pulse of light into the sensing optical fiber. The resulting Rayleigh backscattered signal is observed as a function of time that has elapsed from the launching of the pulse. As a result of the long coherence length of the source, backscattered light from different scatterers within a section of the optical fiber defined by the pulse duration have a stable phase relationship and interference occurs at a detector. The interference process provides a high contrast from which information can be extracted, but only if there is a vector summation of the electric field re-radiated by each scatter resulting in a high contrast. Generally, it has been thought that the high contrast could only be achieved using a single-mode fiber. More particularly, when a multimode fiber is used, the near field of the multimode backscatter that is detected by the detection system consists of a number of spots or speckles, each of which has a phase that is random relative to that of other spots. When this light reaches the detector, each of the spots has a good contrast. However, the summation of the spots tends to a mean value. In mathematical terms, each spot (assuming a single polarization) has a negative exponential probability distribution and the sum of the intensity of multiple spots has a F distribution as given in the equation below:

$$P_I(I) = (I)^{(M-1)} \exp(-MI/\bar{I}) / \left[(M-1)!(\bar{I}/M)^M\right] I \geq 0$$
$$= 0 \text{ otherwise}$$

Figure 1:
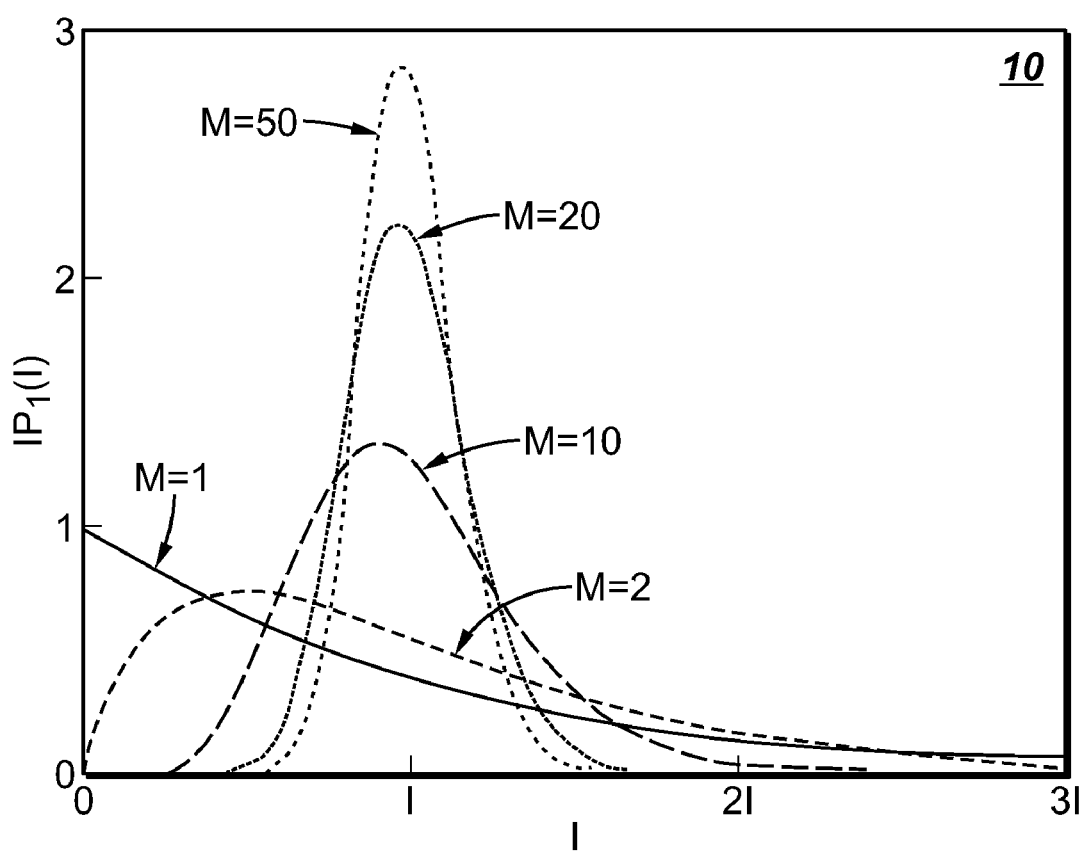
FIG. 1 is a graph illustrating the loss in contrast when a multimode fiber is used for CRN measurements as compared to a single-mode fiber.

For a single-mode fiber, M=1 (or 2, if two polarizations are present). However, in multimode fibers, the number of spots is typically more than 100 and the probability distribution is approximated by a Gaussian distribution, with the values tightly distributed around the mean. Thus, for a multimode fiber, the contrast in the detected signal all but disappears. This reduction in contrast between a single-mode fiber and a multimode fiber is illustrated in the graph 10 of FIG. 1, where it can be seen that the probability distribution narrows substantially as the number of spots and/or polarizations "M" increase. Accordingly, in general, coherent OTDR in a multimode optical fiber does not result in the same contrast- and phase-sensitive effects as exist for single-mode fibers, owing to the phase averaging over multiple spots. Because of this phase averaging, CRN acquisition techniques have generally been thought to not be suited for use with multimode fibers.

Figure 2:
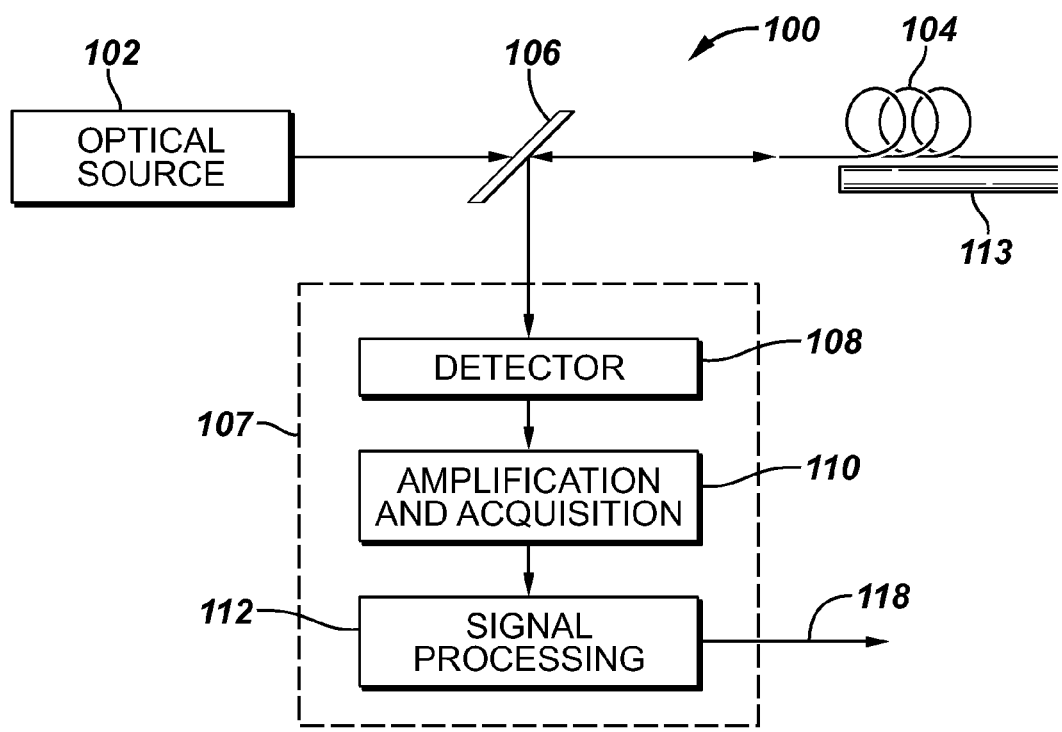
FIG. 2 is a block diagram of a prior art OTDR system with CRN acquisition that is implemented using a single mode sensing optical fiber.

Turning now to FIG. 2, a block diagram of a prior art coherent OTDR system that detects Rayleigh backscatter is shown. The OTDR system 100 includes a narrow band pulsed optical source 102 which is configured to launch a pulse of light into a single-mode sensing optical fiber 104 through a beam splitter 106. In the embodiment illustrated, the sensing fiber 104 is deployed proximate an elongate structure 113. However, in other embodiments, the fiber 104 may be coupled with or contained with the structure 113.

Referring still to FIG. 2, reflections from various scatterers in the sensing optical fiber 104, such as Brillouin backscatter, Raman backscatter, and coherent Rayleigh noise, are directed to a data acquisition system 107 by the beam splitter 106. In the embodiment illustrated in FIG. 2, the data acquisition system 107 includes an optical detector 108 that detects the reflected signals, an amplification and acquisition system 110 that amplifies and acquires the desired signals detected by the optical detector 108, and a signal processing unit 112 that processes the acquired data and converts it into information that corresponds to various detected conditions, such as a vibration or disturbance, that may provide information about the state of an elongate structure 113 proximate to which the sensing optical fiber 104 is deployed. This information may be output from the signal processing unit 112 as an output signal 118 that is indicative of the detected condition. For instance, the output signal 118 may be provided to a user interface, stored in a memory of a data storage system, etc.

As explained above, if the optical fiber in FIG. 2 were a multimode optical fiber, essentially no contrast may be detected in the interference from the coherent Rayleigh noise that is detected at the detector 108. Accordingly, the arrangement illustrated in FIG. 2 is not well-suited to detecting vibration or disturbances when the sensing optical fiber 104 is of the multimode type. However, in accordance with an embodiment of the invention, it is possible to modify or retrofit the fiber infrastructure of FIG. 2 when a multimode fiber is in place in an existing installation such that CRN techniques may be used. Such modification may be particularly useful since there are many existing installations of multimode optical fibers used for DTS and other applications in existing infrastructures, such as energy cables, railway tunnels, liquefied unloading pipelines, process vessels, etc. By modifying the existing fiber infrastructure, these previously installed multimode optical fibers may be used for a CRN acquisition system either alone or in combination with a DTS acquisition system.

Figure 3:
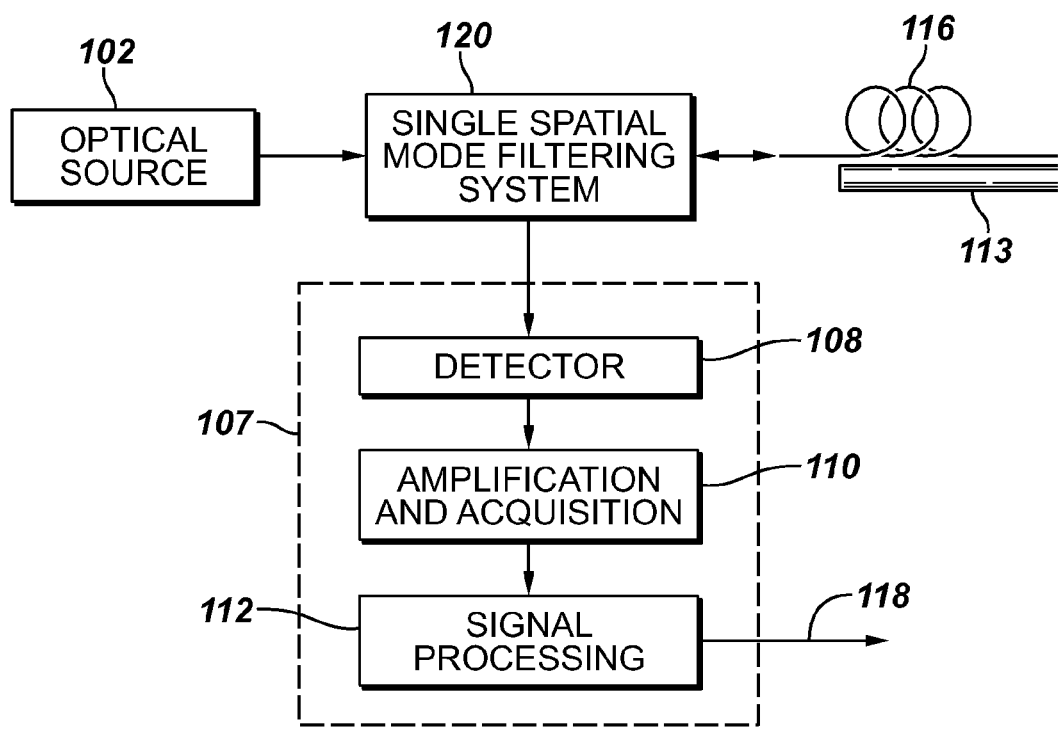
FIG. 3 is a block diagram of an OTDR system with CRN acquisition using a multimode sensing optical fiber, in accordance with an embodiment of the invention.

Turning now to FIG. 3, an exemplary embodiment of the invention is shown in which an existing multimode fiber infrastructure has been modified to provide for use of a multimode optical fiber as the sensing optical fiber in an OTDR system used for CRN measurements. Specifically, as shown in FIG. 3, a single spatial mode filtering system 120 that forces selection of a single speckle from the returned Rayleigh backscatter is placed in the path between a multimode sensing optical fiber 116 and a data acquisition system 107. Such a single spatial mode filtering system 120 also eliminates the phase variation arising from collecting multiple speckle spots, thus ensuring good contrast of the resulting coherent backscatter signal.

In addition to modifying the existing fiber infrastructure by adding the single spatial mode filtering system 120, the optical source 102 and the data acquisition system 107 also may be modified as necessary to appropriately interrogate and acquire the information from the Rayleigh backscatter produced by the multimode sensing fiber 116. For instance, an existing optical source may be replaced by a narrow band pulsed source that is more suited for coherent Rayleigh interrogation. Alternatively, an existing optical source may remain in place and a narrow band pulsed source may be added specifically for interrogating the multimode sensing fiber 116 for acquiring Rayleigh backscatter. Likewise, the detector and amplification and acquisition modules in the data acquisition system 107 may be configured as appropriate to detect and acquire the Rayleigh backscatter.

For instance, in one embodiment, the optical source 102 is a narrow-band pulsed source which includes a distributed feedback fiber laser. The source 102 may operate at a 1550 nanometer wavelength and have a line width on the order of 2 kHz or less. The source 102 further may have a frequency stability that is better than 1 MHz/minute. To launch a pulse into the sensing optical fiber 116, the source 102 may include a modulator (e.g., an acoustic-optic modulator) to extract a pulse from the continuous output of the distributed feedback fiber laser 102. In one embodiment of the invention, the width of the pulse extracted from the continuous output is approximately 80-100 nanoseconds. In some embodiments of the invention, amplification of the pulse also may be desirable. In embodiments of the invention in which optical amplification is used to boost the pulse, spectral filtering may be used at either the source 102 or prior to a detector 108 of the data acquisition system 107 to reduce the effects of amplified spontaneous emission in the optical amplifier. In such embodiments, it may also be desirable to time-gate the amplified pulses to eliminate amplified spontaneous emission between pulses.

In the embodiment illustrated in FIG. 3, the beam splitter 106 function, the launching of the pulse into the multimode sensing optical fiber 116, the selection of the single speckle of the Rayleigh backscatter and direction of the backscattered light to the detector 108 may all be carried out in the single spatial mode filtering system 120.

Figure 4:
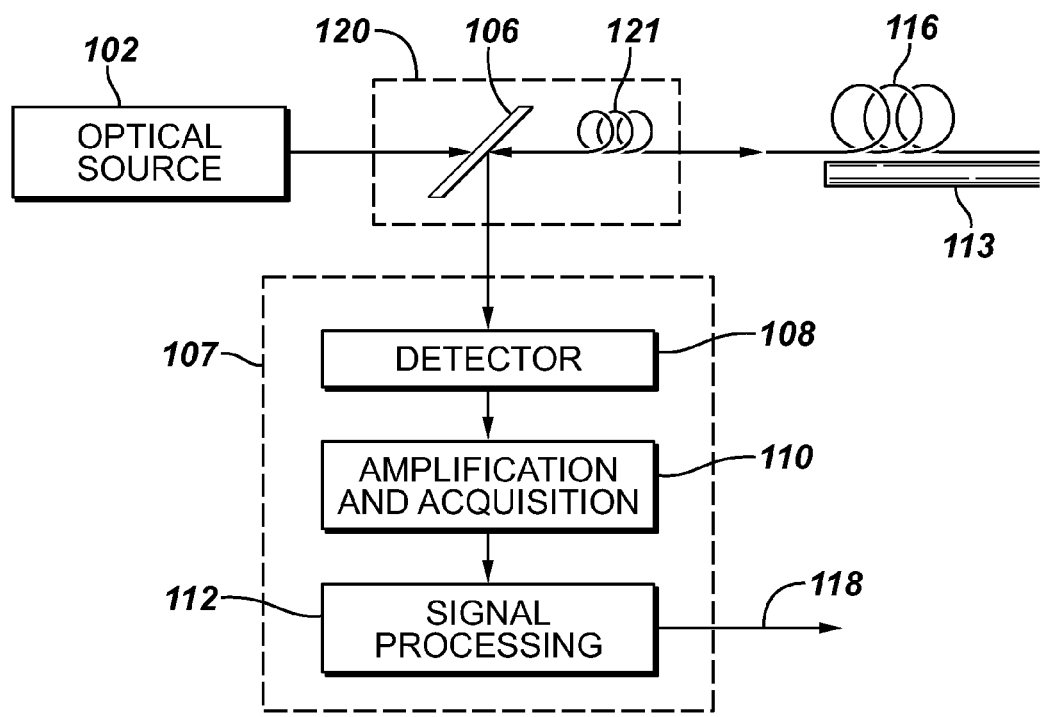
FIG. 4 is a block diagram of an exemplary embodiment of the OTDR system of FIG. 3, in accordance with an embodiment of the invention.

In one embodiment, and as shown in FIG. 4, the single spatial mode filtering system 120 includes a single-mode fiber 121 which itself functions as a spatial filter because a single-mode fiber only propagates the lowest order spatial mode, which requires the light across the entire area of the guided mode to be in phase. As a result, amongst the hundreds of speckles across the core of the multimode sensing fiber 116, the single mode in the fiber 121 selects a summation of electric fields that can launch efficiently into its fundamental mode. The use of a single-mode fiber 121 in the single spatial mode filtering system 120 is a particularly robust solution as in that there is no risk of misalignment of optics as might otherwise occur if a free-space optics system were employed. Further, the use of a single-mode fiber 121 also provides for the use of traditional components, such as fiber couplers or circulators, to implement the beam splitter 106.

Figure 5:
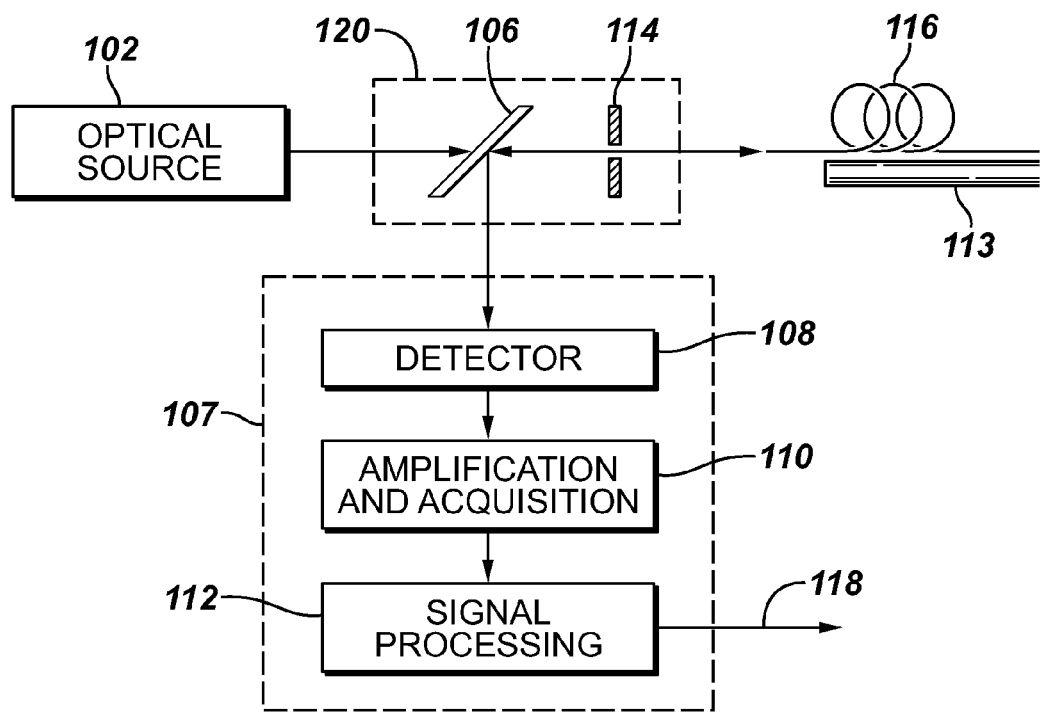
FIG. 5 is a block diagram of another exemplary embodiment of the OTDR system of FIG. 3, in accordance with an embodiment of the invention.

In alternative embodiments, such as the embodiment illustrated in FIG. 5, the selection of a single speckle from the returned backscatter signal may be achieved by using free-space optics and a separate spatial filter 114, such as a pinhole filter to select a single speckle, or an angular aperture in the far field.

Figure 6:
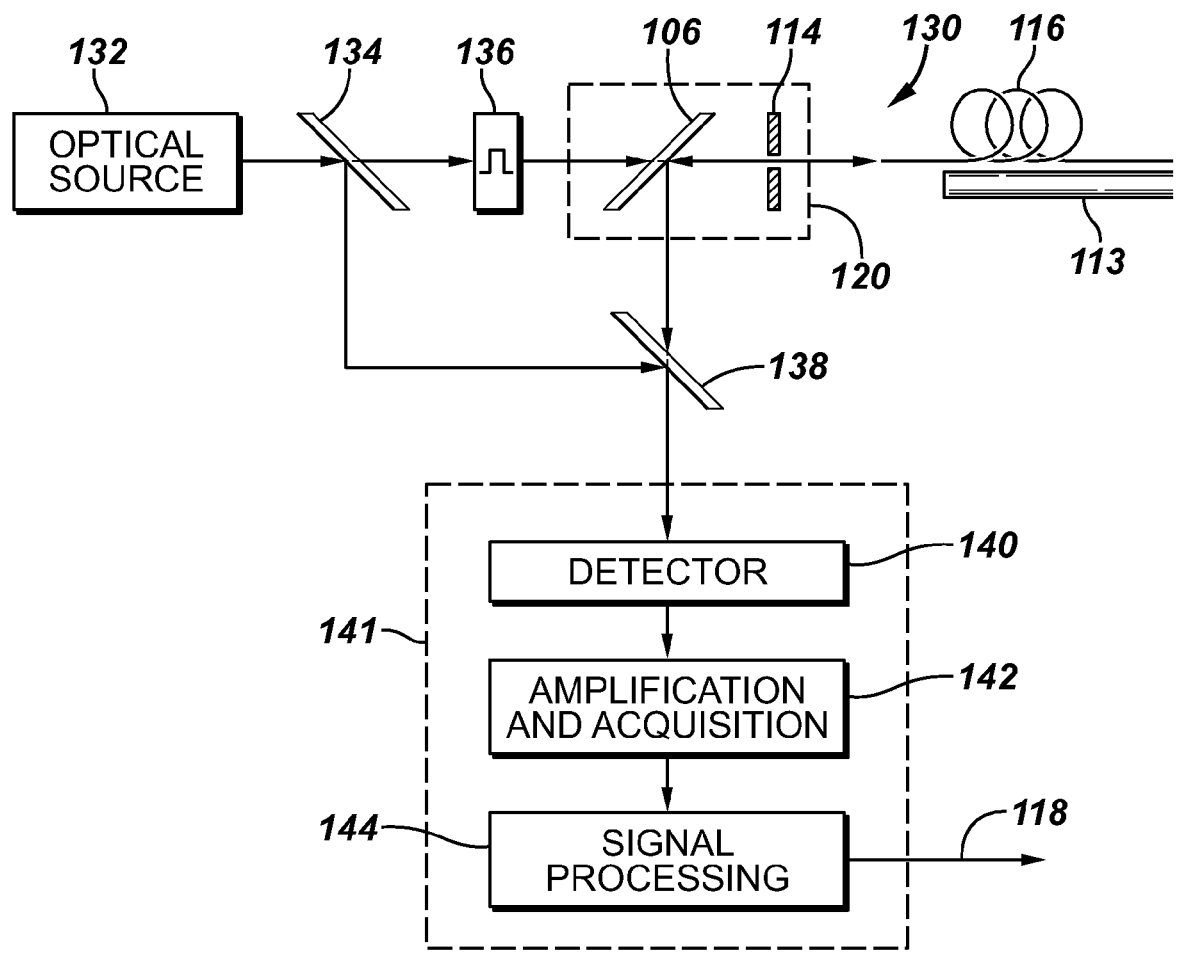
FIG. 6 is a block diagram of a coherent detection arrangement used with the system of FIG. 3, in accordance with an embodiment of the invention.

An alternative embodiment of an OTDR system 130 for either heterodyne or homodyne coherent detection of the Rayleigh backscatter is illustrated in FIG. 6. In this embodiment, a source 132 is a narrow band continuous wave optical source. The continuous output from the source 132 is split by a beam splitter 134 between first and second paths. The first path includes a modulator 136 to modulate the continuous wave output from the source 132 and provide a pulse that is then launched into the multimode sensing optical fiber 116. The second path from the source 132 provides a portion of the output of the continuous wave source 132 (i.e., the local oscillator) to a beam combiner 138, where the local oscillator portion of the source 132 overlaps with the single speckle selected from the backscattered light received from the sensing fiber 116. The combined light then impinges on a detector 140 of a detection and acquisition system 141 that is responsive to the square of the electric field. When an acousto-optic modulator 136 is used in first order to modulate the signal in the first path, the modulator introduces a frequency shift. In such an embodiment (i.e., a heterodyne detection scheme), various mixing terms are generated, including a term at the difference frequency, which is equal to the frequency shift caused by the modulator 136. While it is possible to implement coherent detection OTDR without a frequency shift, the use of a frequency shift allows for a clear separation between the unshifted light (i.e., the local oscillator signal in the second path) and the signal that results from mixing the Rayleigh backscatter and the local oscillator. The desired backscatter signal then appears at the intermediate frequency, which is equal to the frequency shift provided by the modulator. In other embodiments, the coherent detection may be a homodyne detection scheme where no frequency shift exists between the pulsed output and the local oscillator. This may be achieved by using a modulator that does not shift the laser frequency. Alternatively homodyne detection may be achieved by frequency shifting the local oscillator portion of the source 132 in the second path to match exactly the frequency shift in the pulsed output, resulting in no net frequency difference between local oscillator and probe pulse.

In the embodiment of the system 130 which is illustrated in FIG. 6, the amplification and acquisition system 142 may include a narrow band filter tuned to the frequency shift so that the relevant frequencies of the Rayleigh backscattered signal may be selected and processed by the amplification and acquisition system 142. The electrical signal representative of the Rayleigh backscatter detected by the detector 140 may be processed by the amplification and acquisition system 142 in various different manners. For instance, the detected signal may first be amplified and then rectified and low pass filtered. The data of interest may then be extracted from the amplified, rectified and filtered signal. It should be understood that the single spatial mode filtering system 120 shown in FIG. 6 may include either a spatial filter 114 (as shown) or a single-mode fiber 121 (as shown in FIG. 4) to select the single speckle from the Rayleigh backscatter produced by the sensing fiber 116.

It should be noted that in any of the embodiments described above the speckle-like signal selected by the single spatial mode filtering system 120 is subject to fading. In other words, there are combinations of source frequency and fiber state (e.g., temperature, strain and shape) at which the speckle signal fades at a particular location along the fiber. In such a case, the intensity of the speckle signal either vanishes (in which case the detector 108/140 receives no light to process), or the derivative of intensity with respect to fiber strain vanishes. In either of these situations, the sensing fiber 116 does not provide useful information at that location. To compensate for this type of situation, multiple combinations of spatial filters and acquisition systems may be employed, where each such combination acquires the light arriving at a different speckle. Statistically, it is unlikely that all speckles will fade simultaneously and therefore acquiring a plurality of independent speckles and identifying those that are providing useful information provides a more robust signal through independent channel diversity. The opportunity to use multiple speckles independently to provide diversity is unique to multimode sensing fibres. The process for identifying which speckle signal is providing useful information may be implemented, for example, based on the intensity of the signal in each channel or on an analysis of the noise in each channel.

In various embodiments of the invention, the signal processing unit 112 or 144 may be combined with the amplification and acquisition system 110, 142, respectively, or may be coupled to the amplification and acquisition system 110, 142, respectively, through a communication link such as a network. Alternatively, the signal processing unit may be part of a control center. In one embodiment, the signal processing unit comprises a control system having a CPU, a memory, an input device, and an output device. The memory may store data and/or algorithms for identifying conditions associated with the elongate structure 113 based on the currently-detected data as well as historical data. The input device may be a variety of types of devices, such as a keyboard, mouse, a touch screen, etc. The output device may include a visual and/or audio output device, such as a monitor having a graphical user interface.

The OTDR system illustrated in FIGS. 3-6 may be used in a variety of different applications to detect disturbances to various different types of elongate structures, such as pipelines, electrical cables, etc. For instance, optical fibers are commonly installed within or attached to power cables, particularly those at or above ratings of 132 KV, in order to monitor the cables' temperature profile. Typically, in such installations, the sensing optical fiber is a multimode optical fiber as this type of fiber is the type preferred for Raman distributed temperature sensing, particularly when measuring temperature at distances of up to ten to fifteen kilometers. By modifying or retrofitting the fiber optic infrastructure to include a single spatial mode filtering system, such as the system 120 described above, and the appropriately configured interrogation equipment (e.g., source 102/132 and detection acquisition system 107/141), these previously installed multimode optical fibers may be surveyed or permanently monitored for disturbances, such as may occur as a result of inadvertent digging or partial discharge events. Thus, the CRN measurement itself may be used to identify the onset or occurrence of cable failure. In addition, because the CRN measurement is sensitive to temperature as well as strain, the addition of the CRN capability to preexisting systems may help in the diagnosis of weak changes in temperature and thus to help interpret the temperature measurements provided by the detection of Raman scattering.

There also are many existing installations of multimode optical fiber in hydrocarbon wells that are used for distributed temperature sensing to derive information regarding steam or water injection in the well or the location of produced fluid inflow, for example. In installations in which the multimode optical fiber is tightly confined to track the length of the cable into which it is fitted, the modification of the fiber optic infrastructure to include the single-mode optics arrangement for acquired CRN data described above may be used to detect disturbances (e.g., vibration, small changes indicative of disturbances, etc.) to the monitored cable.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. An optical time domain reflectometry (OTDR) system, comprising:
    a multimode sensing optical fiber;
    an optical source configured to output a pulse of light for launching into the multimode sensing optical fiber;
    an optical detector; and
    a single spatial mode filtering system coupled between the multimode sensing optical fiber and the optical detector, the single spatial mode filtering system configured to select for detection by the optical detector a single speckle of Rayleigh backscattered light produced by the multimode sensing optical fiber in response to the pulse of light.

2. The system of claim 1, wherein the single spatial mode filtering system comprises a single-mode fiber to select the single speckle of Rayleigh backscattered light.

3. The system of claim 1, wherein the single spatial mode filtering system comprises a spatial filter coupled between the multimode sensing optical fiber and the data acquisition system.

4. The system of claim 3, wherein the spatial filter comprises a pinhole filter.

5. The system of claim 1, wherein the multimode sensing optical fiber is disposed proximate an elongate structure for sensing a disturbance to the elongate structure.

6. The system of claim 5, further comprising a data acquisition system coupled to the detector, the data acquisition system configured to produce an output signal indicative of the disturbance to the elongate structure based on the selected single speckle of Rayleigh backscattered light.

7. The system of claim 1 further comprising:
    an optical combiner coupled to a first optical path, a second optical path, and the optical detector, wherein the optical source is configured to output the pulse of light at a first optical frequency in the first optical path, and a second optical signal at a second optical frequency in the second optical path, wherein the second optical frequency is different than the first optical frequency, and wherein the optical combiner is configured to combine the selected single speckle produced in response to the pulse of light in the first optical path with the second optical signal in the second optical path to produce a combined optical signal for detection by the detector.

8. The system of claim 7,
    wherein the optical detector is configured to detect a frequency difference between the first optical frequency and the second optical frequency based on the combined optical signal.

9. The system of claim 1 wherein the multimode sensing optical fiber is disposed in a wellbore.

10. The system of claim 1 wherein the multimode sensing optical fiber is contained within the elongate structure.

11. A method for sensing a disturbance to an elongate structure, comprising:
    providing a multimode sensing optical fiber disposed proximate the elongate structure;
    launching a pulse of light into the multimode sensing optical fiber;
    selecting a single speckle of Rayleigh backscattered light produced by the multimode sensing optical fiber in response to the pulse of light; and
    generating a signal indicative of a disturbance to the elongate structure based on the selected single speckle.

12. The method as recited in claim 11, further comprising:
    providing a single-mode fiber coupled to the muitmode sensing optical fiber to select the single speckle of Rayleigh backscattered light.

13. The method as recited in claim 11, further comprising:
    splitting an optical signal generated by an optical source between a first optical path and a second optical path; and
    modulating a first portion of the optical signal in the first optical path to produce the pulse of light for launching into the multimode sensing optical fiber, the pulse of light having a first optical frequency, wherein a second portion of the optical signal in the second optical path has a second optical frequency different than the first optical frequency.

14. The method as recited in claim 13, further comprising:
    combining the second portion of the optical signal in the second optical path with the selected single speckle of the Rayleigh backscattered signal; and
    detecting a signal at the difference-frequency between the first optical frequency and the second optical frequency based on the combining.

15. The method as recited in claim 11, further comprising:
    detecting Raman scattering light produced by the multimode sensing optical fiber in response to the launched pulse of light; and providing a signal indicative of a monitored parameter of the elongate structure based on the detected Raman scattering light.

16. The method as recited in claim 11, further comprising: deploying the multimode sensing optical fiber in a wellbore.

17. A method of retrofitting an optical time domain reflectometry (OTDR) installation having a multimode sensing optical fiber deployed proximate an elongate structure, an optical source for launching a pulse of light into the multimode sensing optical fiber, and an optical detector for detecting Rayleigh backscattered light produced by the multimode sensing optical fiber in response to the launched pulse of light, the method comprising:
coupling a single spatial mode filtering system between the multimode sensing optical fiber and the optical detector, wherein the single spatial mode filtering system is configured to select a single speckle of the Rayleigh backscattered light produced by the multimode sensing optical fiber in response to the launched pulse of light.

18. The method as recited in claim 17, wherein the single spatial mode filtering system comprises a single-mode optical fiber.

19. The method as recited in claim 17, wherein the single spatial mode filtering system comprises a spatial filter.

20. The method as recited in claim 17, further comprising:
providing a data acquisition system coupled to the optical detector to generate a signal indicative of a disturbance to the elongate structure based on the selected single speckle.

* * * * *